(12) United States Patent
Hu

(10) Patent No.: US 10,562,739 B2
(45) Date of Patent: Feb. 18, 2020

(54) SYNCHRONIZED ELECTRONIC SAFETY ACTUATOR

(71) Applicant: OTIS ELEVATOR COMPANY, Farmington, CT (US)

(72) Inventor: Guohong Hu, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 230 days.

(21) Appl. No.: 15/686,358

(22) Filed: Aug. 25, 2017

(65) Prior Publication Data
US 2019/0062113 A1 Feb. 28, 2019

(51) Int. Cl.
| | | |
|---|---|---|
| B66B 5/22 | (2006.01) |
| B66B 9/00 | (2006.01) |
| F16H 19/02 | (2006.01) |
| F16H 19/04 | (2006.01) |
| B66B 5/04 | (2006.01) |

(52) U.S. Cl.
CPC .............. B66B 5/22 (2013.01); B66B 9/00 (2013.01); F16H 19/02 (2013.01); F16H 19/04 (2013.01); B66B 5/044 (2013.01)

(58) Field of Classification Search
CPC ... B66B 5/22; B66B 9/00; F16H 19/02; F16H 19/04
See application file for complete search history.

(56) References Cited

U.S. PATENT DOCUMENTS

| | | | | |
|---|---|---|---|---|
| 1,517,936 A | * | 12/1924 | Baker ...................... B66B 5/22 |
| | | | | 187/376 |
| 4,453,858 A | * | 6/1984 | Guiader ................ E02B 17/06 |
| | | | | 254/95 |
| 5,791,442 A | * | 8/1998 | Arnold ..................... H01F 5/00 |
| | | | | 188/138 |

(Continued)

FOREIGN PATENT DOCUMENTS

| | | |
|---|---|---|
| EP | 3112306 A1 | 1/2017 |
| EP | 3141511 A1 | 3/2017 |
| WO | 2013070234 A1 | 5/2013 |

OTHER PUBLICATIONS

Search Report regarding related EP App. No. 18189083.1; dated Feb. 18, 2019; 8 pgs.

*Primary Examiner* — Michael A Riegelman
(74) *Attorney, Agent, or Firm* — Cantor Colburn LLP

(57) ABSTRACT

A selectively operable braking device for an elevator system. The braking device includes a safety brake adapted to be wedged against a guide rail when moved from a non-braking state into a braking state. Also included is an engagement mechanism moveable between an engaged position and a non-engaged position, the engagement mechanism comprising bar pinions each having teeth and connected to at least one of the other bar pinions with a meshed engagement of the teeth, the engagement mechanism configured to move the safety brake between the non-braking state and braking state when the engagement mechanism moves between the non-engaged position and the engaged position. Further (Continued)

included is a plurality of magnetic brake pads, each of the brake pads coupled to one of the bar pinions, wherein movement of one of the brake pads into the engaged position causes movement of the other magnetic brake pads into the engaged position.

18 Claims, 9 Drawing Sheets

(56) References Cited

U.S. PATENT DOCUMENTS

| | | | | |
|---|---|---|---|---|
| 7,575,099 B2* | 8/2009 | Oh | ............................ | B66B 5/06 187/247 |
| 7,650,969 B2* | 1/2010 | Monzon | ................ | B66B 5/0068 187/300 |
| 8,186,483 B2* | 5/2012 | Sirigu | ........................ | B66B 5/22 187/288 |
| 8,312,972 B2* | 11/2012 | Gremaud | .................. | B66B 5/22 187/371 |
| 8,517,150 B2* | 8/2013 | Grundmann | ............ | B66B 17/34 187/359 |
| 8,991,561 B2* | 3/2015 | Husmann | .................. | B66B 5/18 187/359 |
| 9,027,714 B2* | 5/2015 | Husmann | .................. | B66B 5/18 187/373 |
| 9,120,643 B2* | 9/2015 | Meierhans | ................ | B66B 5/20 |
| 9,169,104 B2* | 10/2015 | Legeret | ..................... | B66B 5/20 |
| 9,206,015 B2* | 12/2015 | Osmanbasic | ............. | B66B 5/18 |
| 9,457,989 B2* | 10/2016 | Meierhans | ................ | B66B 5/20 |
| 9,598,264 B2* | 3/2017 | Mizuno | ..................... | B66B 5/22 |
| 9,663,326 B2* | 5/2017 | Osmanbasic | ............. | B66B 5/20 |
| 9,663,327 B2* | 5/2017 | Terry | ........................ | B66B 5/18 |
| 2005/0279580 A1* | 12/2005 | Szentistvany | ......... | B66B 9/0815 187/201 |
| 2013/0056306 A1* | 3/2013 | Lee | ........................ | B66B 13/24 187/314 |
| 2015/0321883 A1* | 11/2015 | Husmann | .................. | B66B 5/20 187/374 |
| 2017/0001835 A1* | 1/2017 | Hu | ............................ | B66B 5/18 |
| 2017/0066627 A1* | 3/2017 | Hu | ............................ | B66B 5/18 |
| 2019/0062113 A1* | 2/2019 | Hu | ............................ | B66B 9/00 |

* cited by examiner

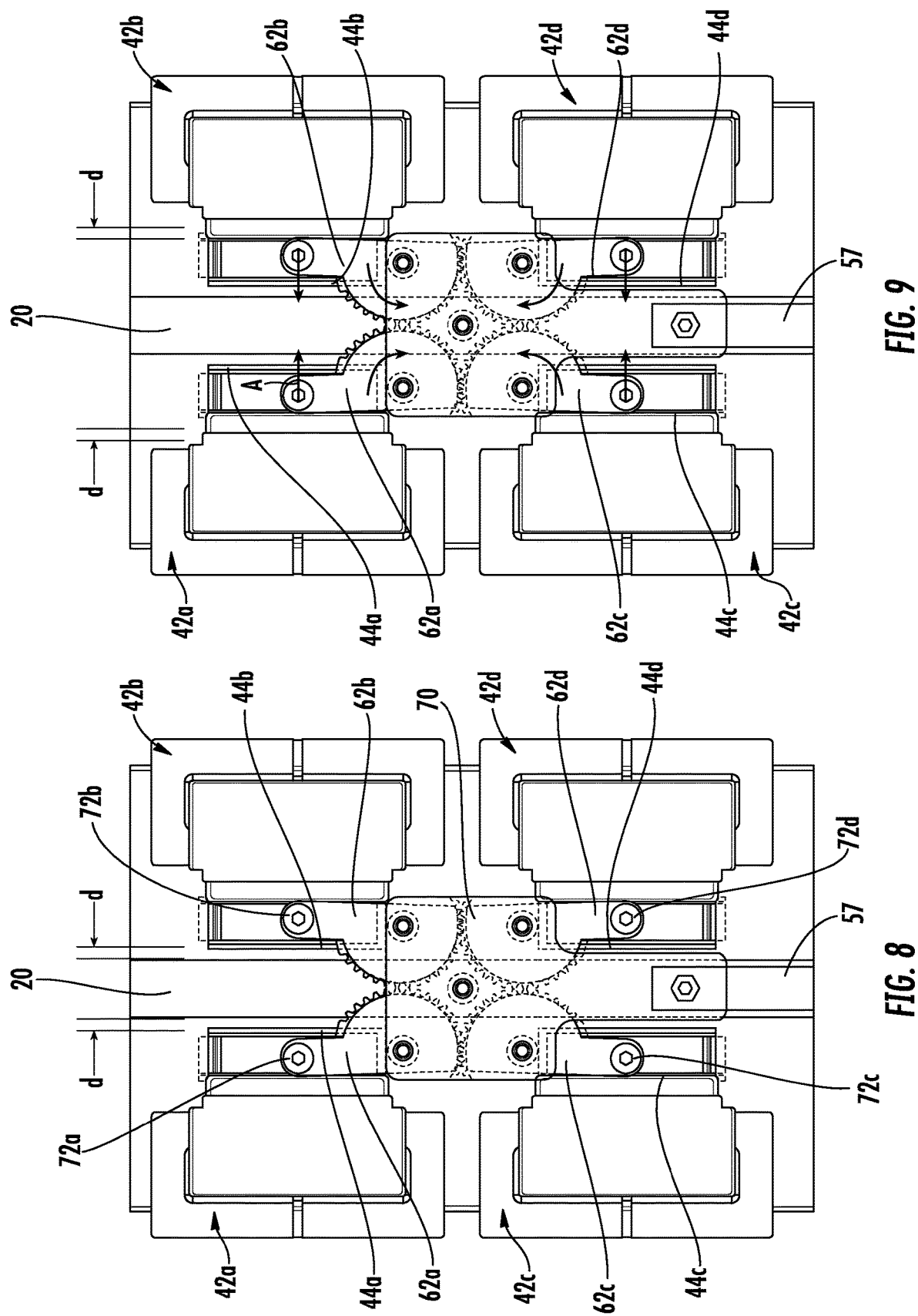

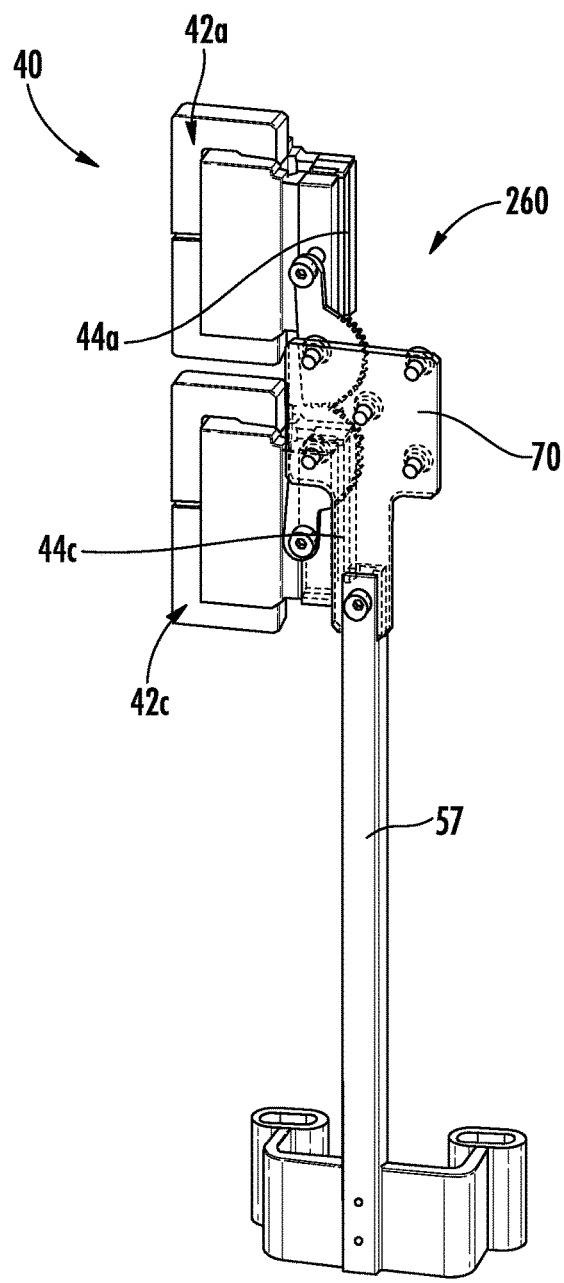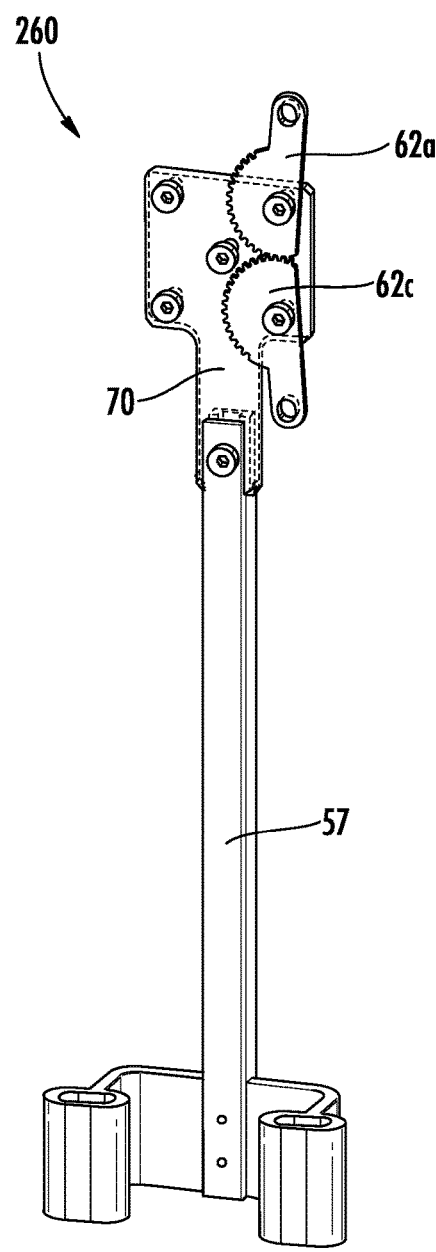
FIG. 12
FIG. 13

SYNCHRONIZED ELECTRONIC SAFETY ACTUATOR

BACKGROUND

Some machines, such as an elevator system, include a safety system to stop the machine when it rotates at excessive speeds or the elevator cab travels at excessive speeds. Conventional safety systems may include a single braking surface for slowing the over rotation or over speed condition. Machines that are large and/or operate at elevated speeds may require additional braking surfaces to handle the additional load and speed while operating reliably. However, when a second, or even further additional, braking surfaces is added, it may become important to synchronize the braking surfacing to improve durability, braking performance and other overall performance factors within the system.

BRIEF SUMMARY

Disclosed is a selectively operable braking device for an elevator system including a car and a guide rail. The braking device includes a safety brake disposed on the car and adapted to be wedged against the guide rail when moved from a non-braking state into a braking state. Also included is an engagement mechanism moveable between an engaged position and a non-engaged position, the engagement mechanism comprising a plurality of bar pinions each having a plurality of teeth and operatively connected to at least one of the other plurality of bar pinions with a meshed engagement of the plurality of teeth, the engagement mechanism operatively coupled to the safety brake and configured to move the safety brake between the non-braking state and braking state when the engagement mechanism moves between the non-engaged position and the engaged position. Further included is a plurality of magnetic brake pads, each of the brake pads operatively coupled to one of the plurality of bar pinions, wherein movement of one of the magnetic brake pads into the engaged position causes movement of the other magnetic brake pads into the engaged position.

In addition to one or more of the features described above, or as an alternative, further embodiments may include that each of the bar pinions are operatively coupled to one of the magnetic brake pads at a first location of each bar pinion and operatively coupled to a connector plate at a second location of each bar pinion, the connector plate coupled to a linkage operatively coupled to the safety brake.

In addition to one or more of the features described above, or as an alternative, further embodiments may include that the engagement mechanism includes four bar pinions, two of the bar pinions disposed on a first side of the guide rail and two of the bar pinions disposed on a second side of the guide rail.

In addition to one or more of the features described above, or as an alternative, further embodiments may include that each of the bar pinions is in toothed engagement with two other bar pinions.

In addition to one or more of the features described above, or as an alternative, further embodiments may include that the engagement mechanism includes two bar pinions, one of the bar pinions disposed on a first side of the guide rail and the other bar pinion disposed on a second side of the guide rail.

In addition to one or more of the features described above, or as an alternative, further embodiments may include that the engagement mechanism includes two bar pinions, both of the bar pinions disposed on the same side of the guide rail.

In addition to one or more of the features described above, or as an alternative, further embodiments may include a plurality of electromagnetic actuators, each of the electromagnetic actuators positioned to electromagnetically drive one of the plurality of magnetic brake pads between the non-engaged position and engaged position.

In addition to one or more of the features described above, or as an alternative, further embodiments may include that at least one of the electromagnetic actuators is in operable communication with a controller, the controller configured to control the electricity supplied to the at least one of the electromagnetic actuators.

In addition to one or more of the features described above, or as an alternative, further embodiments may include that the at least one of the electromagnetic actuators is configured to move the respective magnetic brake pad into the engaged position upon at least one of a reduction, an elimination, and an application of the electricity supplied by the controller.

In addition to one or more of the features described above, or as an alternative, further embodiments may include that the at least one of the electromagnetic actuators is configured to return each of the plurality of magnetic brake pads into the non-engaged position upon reversal of the electricity supplied by the controller.

In addition to one or more of the features described above, or as an alternative, further embodiments may include that the engagement mechanism is configured to synchronize the movement of the plurality of magnetic brake pads between the non-engaged position and the engaged position.

Also disclosed is an elevator system including a hoistway, a guide rail disposed in the hoistway, and a car operably coupled to the guide rail by a car frame for upward and downward travel in the hoistway. Also included is a safety brake disposed on the car and adapted to be wedged against the guide rail when moved from a non-braking state into a braking state. Further included is an engagement mechanism moveable between an engaged position and a non-engaged position, the engagement mechanism comprising a plurality of bar pinions each having a plurality of teeth and operatively connected to at least one of the other plurality of bar pinions with a meshed engagement of the plurality of teeth, the engagement mechanism operatively coupled to the safety brake and configured to move the safety brake between the non-braking state and braking state when the engagement mechanism moves between the non-engaged position and the engaged position. Yet further included is a plurality of magnetic brake pads, each of the brake pads operatively coupled to one of the plurality of bar pinions, wherein movement of one of the magnetic brake pads into the engaged position causes movement of the other magnetic brake pads into the engaged position.

In addition to one or more of the features described above, or as an alternative, further embodiments may include that each of the bar pinions are operatively coupled to one of the magnetic brake pads at a first location of each bar pinion and operatively coupled to a connector plate at a second location of each bar pinion, the connector plate coupled to a linkage operatively coupled to the safety brake.

In addition to one or more of the features described above, or as an alternative, further embodiments may include that the engagement mechanism includes four bar pinions, two of the bar pinions disposed on a first side of the guide rail and two of the bar pinions disposed on a second side of the guide rail.

In addition to one or more of the features described above, or as an alternative, further embodiments may include that each of the bar pinions is in toothed engagement with two other bar pinions.

In addition to one or more of the features described above, or as an alternative, further embodiments may include that the engagement mechanism includes two bar pinions, one of the bar pinions disposed on a first side of the guide rail and the other bar pinion disposed on a second side of the guide rail.

In addition to one or more of the features described above, or as an alternative, further embodiments may include that the engagement mechanism includes two bar pinions, both of the bar pinions disposed on the same side of the guide rail.

Further disclosed is a selectively operable braking device for an elevator system including a car and a guide rail. The braking device includes a safety brake disposed on the car and adapted to be wedged against the guide rail when moved from a non-braking state into a braking state. Also included is a first magnetic brake pad moveable between an engaged condition and a non-engaged condition with the guide rail. Further included is a second magnetic brake pad moveable between the engaged condition and the non-engaged condition with the guide rail. Yet further included is a first toothed rack operatively coupled to the first magnetic brake pad and moveable therewith. Also included is a second toothed rack operatively coupled to the second magnetic brake pad and moveable therewith. Further included is a pinion in toothed engagement with the first toothed rack and the second toothed rack, wherein the operative connection between the toothed racks with the pinion imparts movement of one of the magnetic brake pads upon movement of the other magnetic brake pad.

BRIEF DESCRIPTION OF THE DRAWINGS

The present disclosure is illustrated by way of example and not limited in the accompanying figures in which like reference numerals indicate similar elements.

FIG. 8 is an elevational view of the safety actuation device in a non-engaged condition;

FIG. 9 is an elevational view of the safety actuation device in an engaged condition;

FIG. 12 is a perspective view of the safety actuation device according to another aspect of the disclosure;

FIG. 13 is a perspective view of the engagement mechanism of the safety actuation device of FIG. 12.

DETAILED DESCRIPTION

Figure 1:
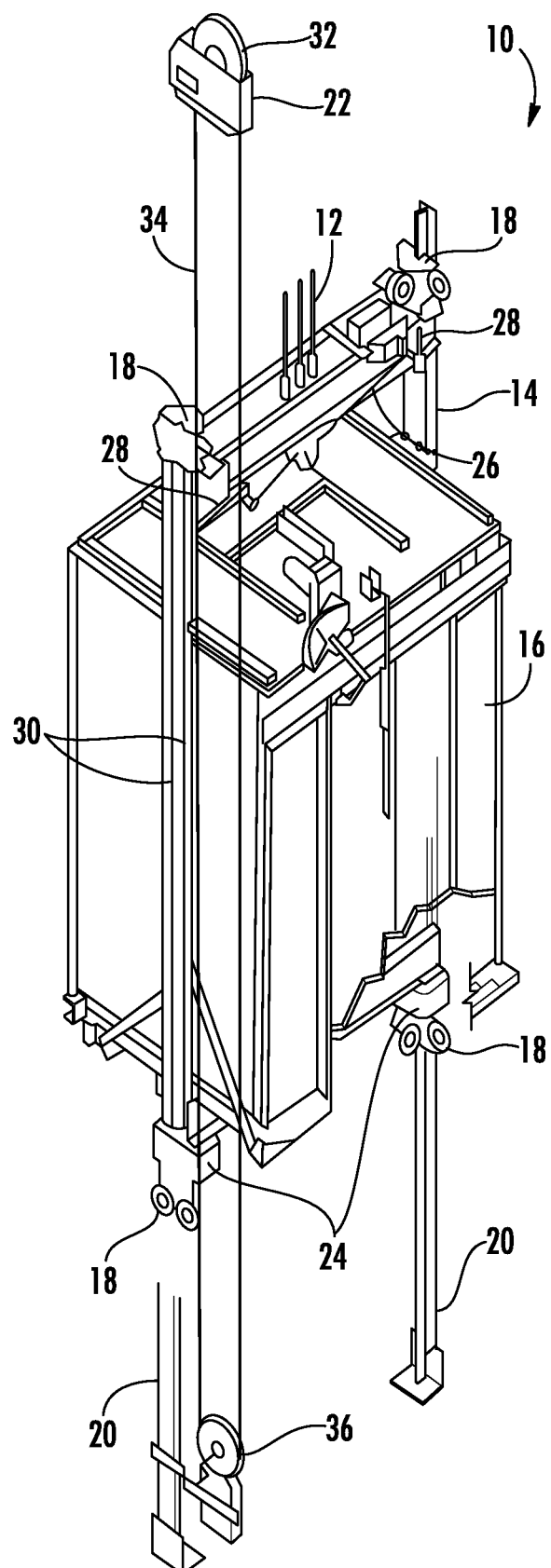
FIG. 1 is a schematic diagram of an elevator system employing a mechanical governor.

FIG. 1 shows an elevator system, generally referenced with numeral 10. The elevator system 10 includes cables 12, a car frame 14, an elevator car 16, roller guides 18, guide rails 20, a governor 22, safety brakes 24, linkages 26, levers 28, and lift rods 30. Governor 22 includes a governor sheave 32, rope loop 34, and a tensioning sheave 36. Cables 12 are connected to car frame 14 and a counterweight (not shown in FIG. 1) inside a hoistway. Elevator car 16, which is attached to car frame 14, moves up and down the hoistway by force transmitted through cables or belts 12 to car frame 14 by an elevator drive (not shown) commonly located in a machine room at the top of the hoistway. Roller guides 18 are attached to car frame 14 to guide the elevator car 16 up and down the hoistway along guide rail 20. Governor sheave 32 is mounted at an upper end of the hoistway. Rope loop 34 is wrapped partially around governor sheave 32 and partially around tensioning sheave 36 (located in this embodiment at a bottom end of the hoistway). Rope loop 34 is also connected to elevator car 16 at lever 28, ensuring that the angular velocity of governor sheave 32 is directly related to the speed of elevator car 16.

In the elevator system 10 shown in FIG. 1, governor 22, an electromechanical brake (not shown) located in the machine room, and the safety brake 24 act to stop elevator car 16 if it exceeds a set speed as it travels inside the hoistway. If elevator car 16 reaches an over-speed condition, governor 22 is triggered initially to engage a switch, which in turn cuts power to the elevator drive and drops the brake to arrest movement of the drive sheave (not shown) and thereby arrest movement of elevator car 16. If, however, the elevator car 16 continues to experience an over speed condition, governor 22 may then act to trigger the safety brake 24 to arrest movement of elevator car 16. In addition to engaging a switch to drop the brake, governor 22 also releases a clutching device that grips the governor rope 34. Governor rope 34 is connected to the safety brake 24 through mechanical linkages 26, levers 28, and lift rods 30. As elevator car 16 continues its descent unaffected by the brake, governor rope 34, which is now prevented from moving by actuated governor 22, pulls on operating lever 28. Operating lever 28 "sets" the safety brake 24 by moving linkages 26 connected to lift rods 30, which lift rods 30 cause the safety brake 24 to engage guide rails 20 to bring elevator car 16 to a stop.

Although the elevator system 10 is illustrated and described above as a "roped" system operated with cables 12, it is to be understood that a "ropeless" and/or hydraulic elevator system may benefit from the embodiments described herein.

Mechanical speed governor systems are being replaced in some elevators by electronic systems. Existing electronic safety actuators typically employ asymmetric safety brake configurations. These devices typically have a single sliding wedge forcibly engaging the elevator guide rail 20. Described herein is an electronic elevator safety actuation device 40 that is suitable for actuating and resetting symmetric safety brakes 24 that have two sliding wedges to engage the guide rail 20 of the elevator system 10.

Figure 2A:
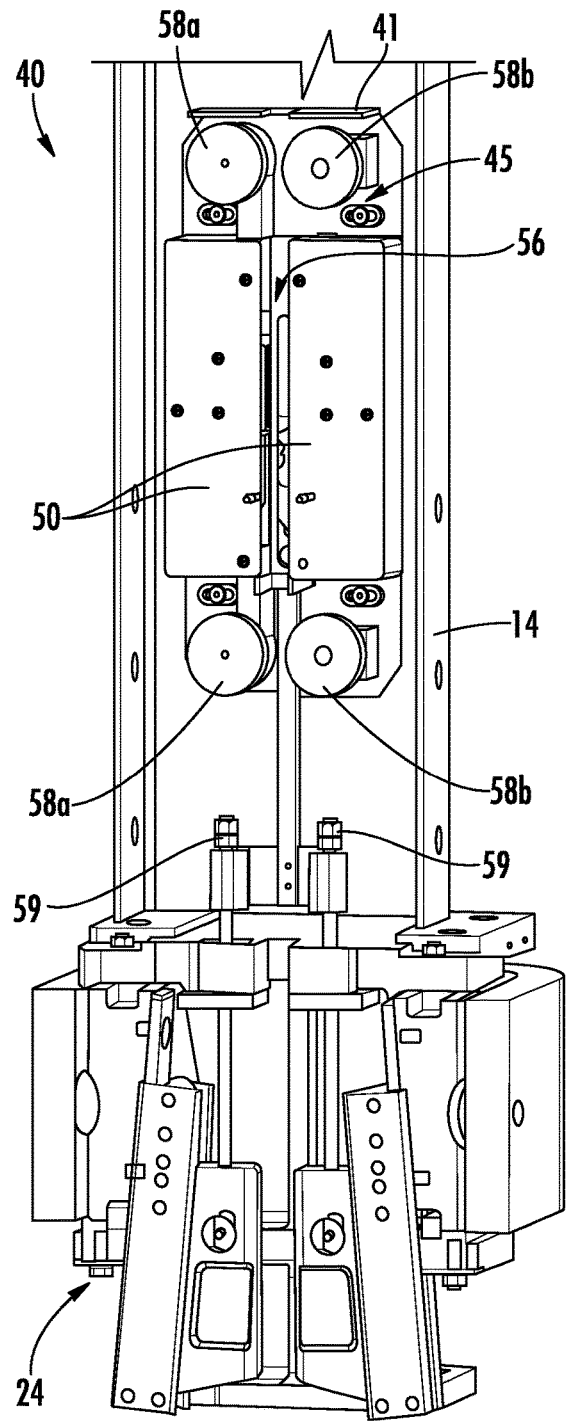
FIG. 2A is a perspective view of safety actuation device and safety brake.
Figure 2B:
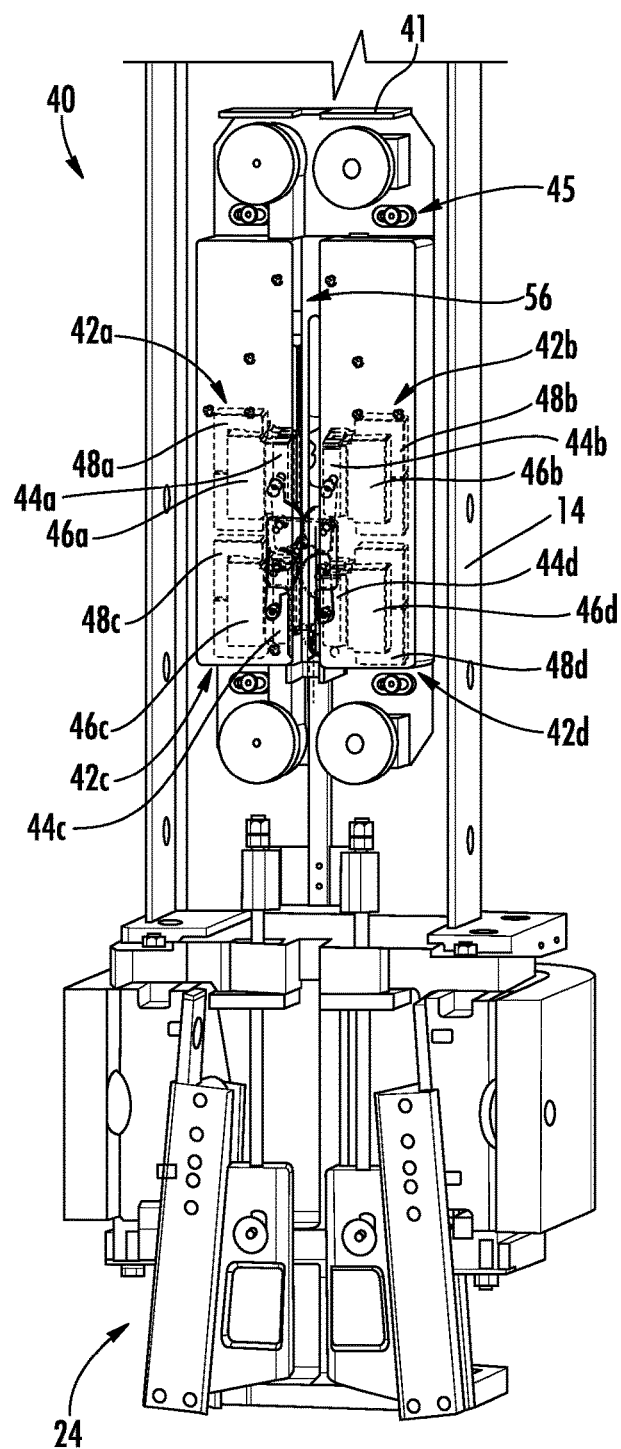
FIG. 2B is a perspective view of the safety actuation device and safety brake with a cover removed to illustrate aspects of the disclosure.
Figure 3:
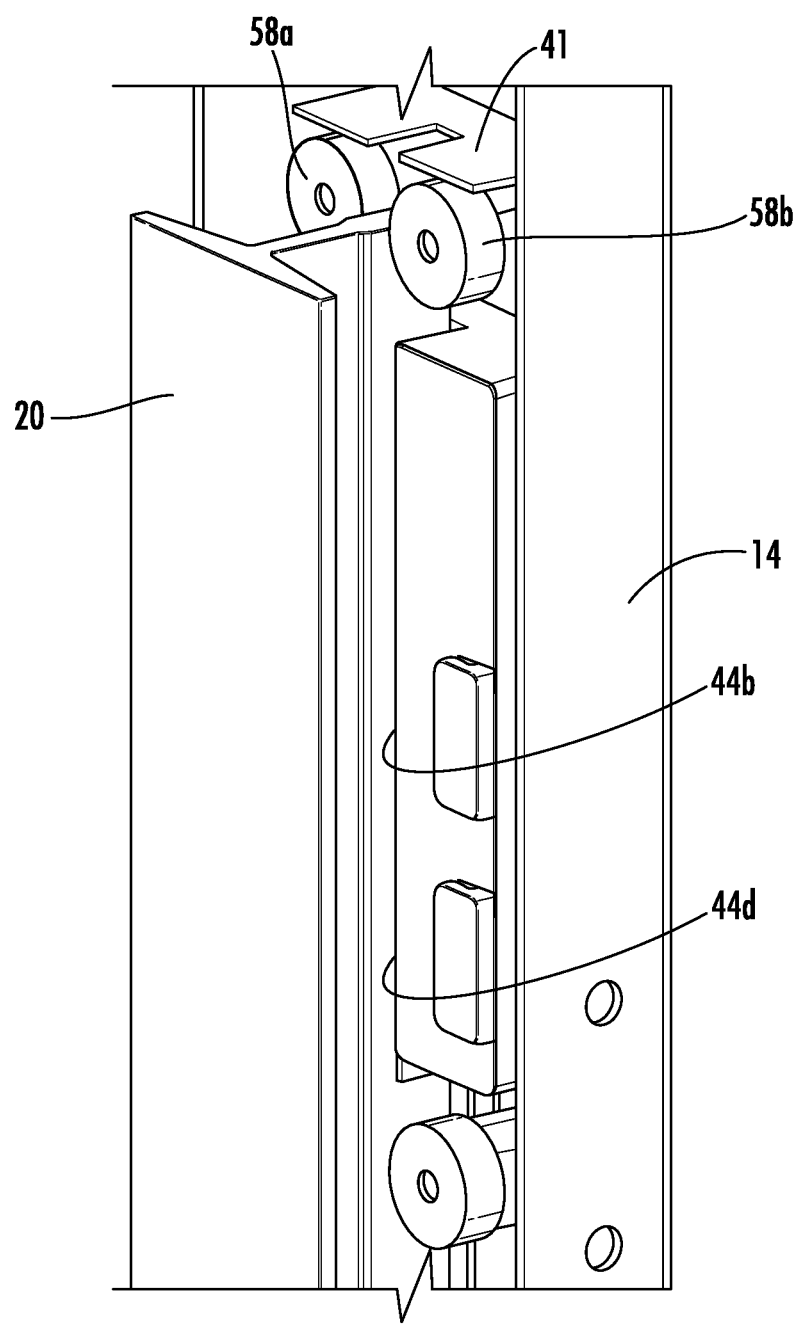
FIG. 3 is a perspective view of a guide rail disposed proximate the safety actuation device.

FIGS. 2A and 2B show an embodiment of an assembly for a safety actuation device 40 affixed to the car frame 14. In an embodiment the safety actuation device 40 includes a mounting plate 41 with electromagnetic actuators shown generally as 42a, 42b, 42c, 42d, with magnetic brake pads shown generally as 44a, 44b, 44c, 44d affixed to the mounting plate 41 within a housing 50 (FIG. 2A), the housing 50 being removed in FIG. 2B. The mounting plate 41 includes at least one aperture 45 disposed therein for mounting the safety actuation device 40 to the car frame 14. The apertures 45 on the mounting plate 41 and the fasteners fixed on the car frame 14 allow a safety actuation device 40 to be floating horizontally when there is position variation between the elevator car 16 and the guide rail 20, which typically occurs during an elevator normal run as well as when actuating and resetting the safety brake 24. The safety actuation device 40 further includes a channel 56 extending substantially perpendicular from the mounting plate 41, and configured to surround the guide rail 20. The guide rail 20 is disposed within the channel 56, as shown in FIG. 3.

With continued reference to FIGS. 2A and 2B, a first pair of rollers 58a and a second pair of rollers 58b may be positioned above and/or below the two housings 50 and positioned to each side of the channel 56. The guide rail 20 is disposed within the channel 56 with the first pair of rollers 58a and the second pair of rollers 58b engaged with the guide rail 20 to minimize the impact of position variations between the safety actuation device 40 and the guide rail 20, as shown in FIG. 3. It will therefore be appreciated that the disclosed embodiments include a mounting assembly 40 having at least one guide device, in this instance first pair of rollers 58a and second pair of rollers 58b disposed about channel 56, or alternatively at least one guide device affixed to the mounting plate 41 to substantially align the channel 56 of the safety actuation device 40 horizontally with respect to the guide rail 20 to improve the performance of safety actuation and reset due to the minimized position variations, (i.e., front to back) between the safety actuation device 40 and the guide rail 20.

Figure 4:
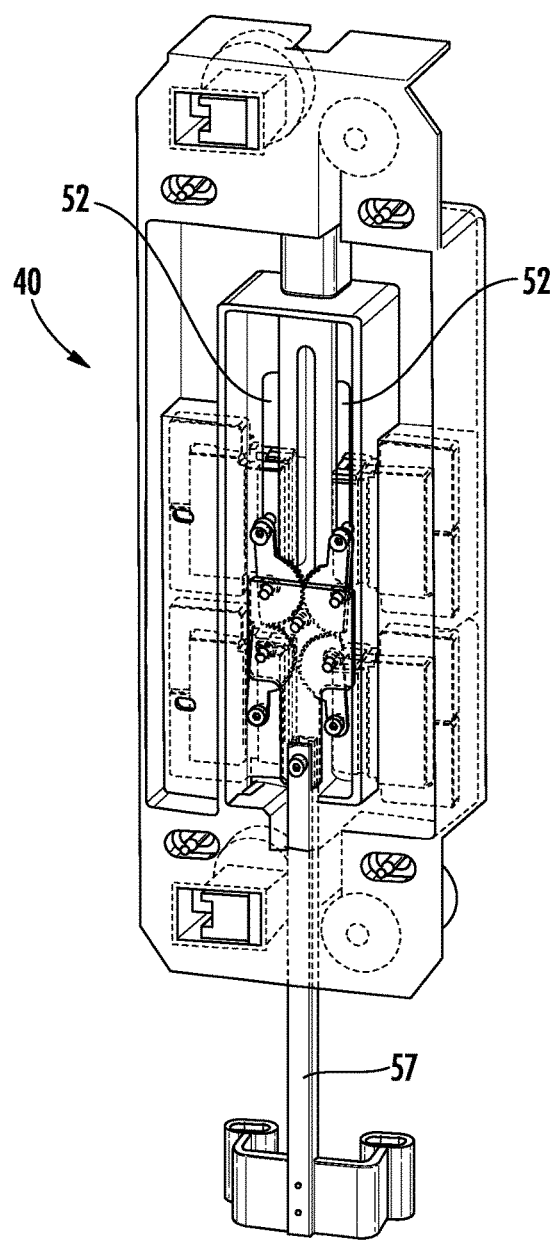
FIG. 4 is a perspective view of the safety actuation device.
Figure 5:
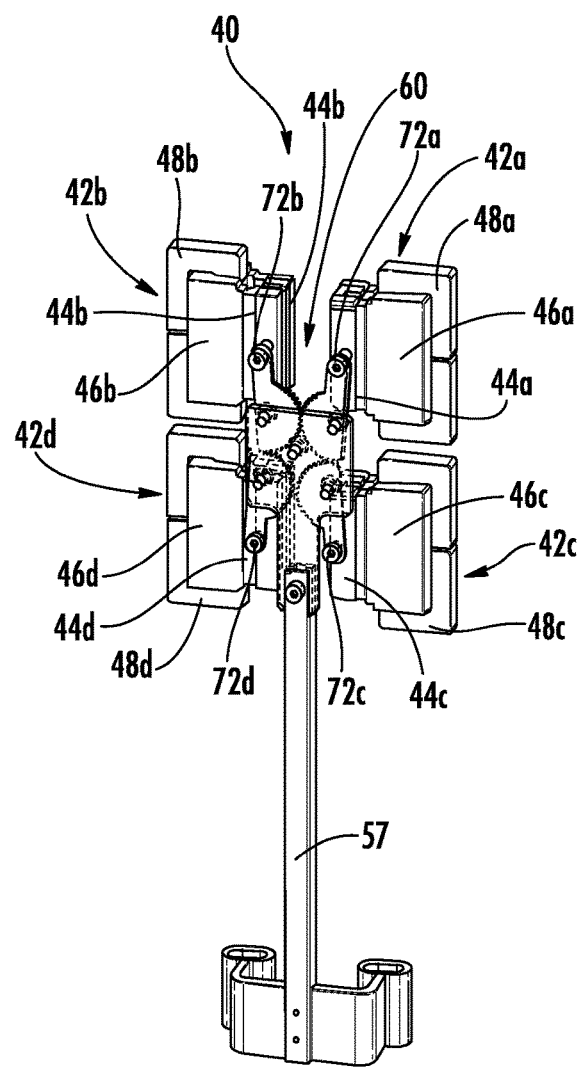
FIG. 5 is a perspective view of the safety actuation device with a housing removed to illustrate aspects of the disclosure.

Referring now to FIGS. 4 and 5, the safety actuation device 40 is illustrated in more detail. The safety actuation device 40 includes, but is not limited to, four electromagnetic actuators 42a, 42b, 42c, 42d, with respective magnetic brake pads 44a, 44b, 44c, 44d. In the illustrated embodiment, actuators 42a, 42c and respective brake pads 44a, 44c are arranged on one side of the channel 56 (FIGS. 2A, 2B, 3) and thereby the guide rail 20 (FIG. 3), while actuators 42b, 42d and respective brake pads 44b, 44d are arranged on an opposite side of the channel 56 and thereby the guide rail 20. The four magnetic brake pads 44a, 44b, 44c, 44d are connected by an engagement mechanism shown generally as 60 that in some embodiments synchronizes magnetic brake pads' 44a, 44b, 44c, 44d horizontal movement towards the guide rail 20 and moves vertically (in the axis of the guide rail 20) along the housing 50 of the safety actuation device 40. In addition, the engagement mechanism 60 increases actuation and reset reliability, by ensuring the electromagnetic actuators can actuate or reset each magnetic brake pad 44a, 44b, 44c, 44d if needed in case any of the electromagnetic actuators 42a, 42b, 42c, 42d encounter a failure. A linkage 57 is used to connect the engagement mechanism 60 and a pair of safety lift rods 59 (FIG. 2A) used to physically engage the safety brake 24. As a result, the safety brake 24 can be actuated and reset reliably through actuation of the engagement mechanism 60 and linkage 57. Advantageously, in the embodiments described, any synchronization errors between the electromagnetic actuators 42a, 42b, 42c, 42d are minimized, as will be described further herein.

With continued reference to FIGS. 4 and 5, the electromagnetic actuators 42a-42d each include a respective coil 48a, 48b, 48c, 48d and a respective core 46a, 46b, 46c, 46d disposed within the housing 50, with magnetic brake pads 44a-44d magnetically attached/associated with each. A controller (not shown) is in electrical communication with each electromagnetic actuator 42a-42d and is configured to control a supply of electricity to the electromagnetic actuators 42a-42d. In the embodiment shown, the core 46a-46d of each electromagnetic actuator 42a-42d facilitates magnetically holding the magnetic brake pads 44a-44d in a default, non-engaged position against the electromagnetic actuator 42a-42d. In operation, if required, the controller is configured to generate a current that creates an electromagnetic force in the electromagnetic actuators 42a-42d to overcome the magnetic holding force between the magnetic brake pads 44a-44d and the core 46a-46d of the electromagnetic actuators 42a-42d. Thereby, under selected conditions the electromagnetic actuators 42a-42d creates a repulsive force between each electromagnetic actuator 42a-42d and the respective magnetic brake pads 44a-44d. For example, in operation upon the identification of an over speed condition and a desire to engage the safety brake 24, a current is applied to the electromagnetic actuators 42a-42d. With a reduction of the hold power and/or generation of a repulsive force, the electromagnetic actuators 42a-42d is configured to release the respective magnetic brake pads 44a-44d. As a result, the magnetic brake pads 44a-44d are propelled into the channel 56 towards the guide rail 20 into a rail-engaging position and the magnetic brake pads 44a-44d magnetically attach to the guide rail 20. In some embodiments, current is constantly applied to keep the brake pads 44a-44d off the guide rail 20 and when current is not applied, the pads are attracted to guide rail 20. The magnetic brake pads 44a-44d are operably coupled to the safety brake 24 through engagement mechanism 60 and via linkage 57 and rods 59. The magnetic brake pads 44a-44d, once magnetically attached to the guide rail 20, pulls the safety brake 24 in an upward direction due to the relative upward movement of the magnetic brake pads 44a-44d relative to the descending elevator car 16. The safety brake 24 engages the guide rail 20 to arrest the motion of the elevator car 16.

In another embodiment, if operation of the safety brake is required, the controller is configured to reduce or eliminate the holding force between the magnetic brake pads 44a-44d and the electromagnetic actuators 42a-42d by reducing the amount of electrical energy supplied to the electromagnetic actuator 42a-42d under selected conditions and/or applying electricity to create a repulsive force between each electromagnetic actuator 42a-42d and the respective magnetic brake pads 44a-44d. It will be appreciated that while the engagement and disengagement of the safety actuation device 40 is described with respect to employing electromagnetic actuators 42a-42d, other forms of actuation are possible and envisioned. For example, a mechanical mechanism such as springs, latches, control arms, pneumatics and the like could be used to move the magnetic brake pads 44a-44d between the nonengaging and engaging positions. In particular, for example a spring with a release mechanism could be used to propel the magnetic brake pads 44a-44d from the nonengaging position, to an engaging position where they would adhere to the guide rail 20.

Figure 7:
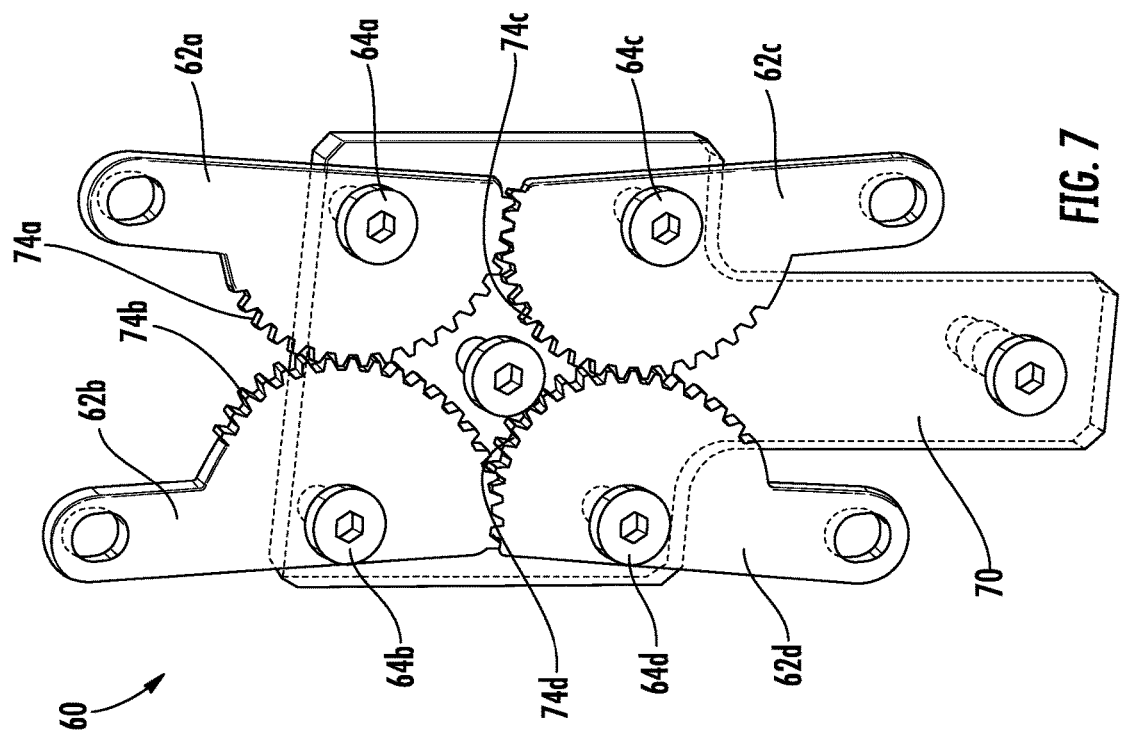
FIG. 7 is an enlarged, perspective view of the engagement mechanism.
Figure 6:
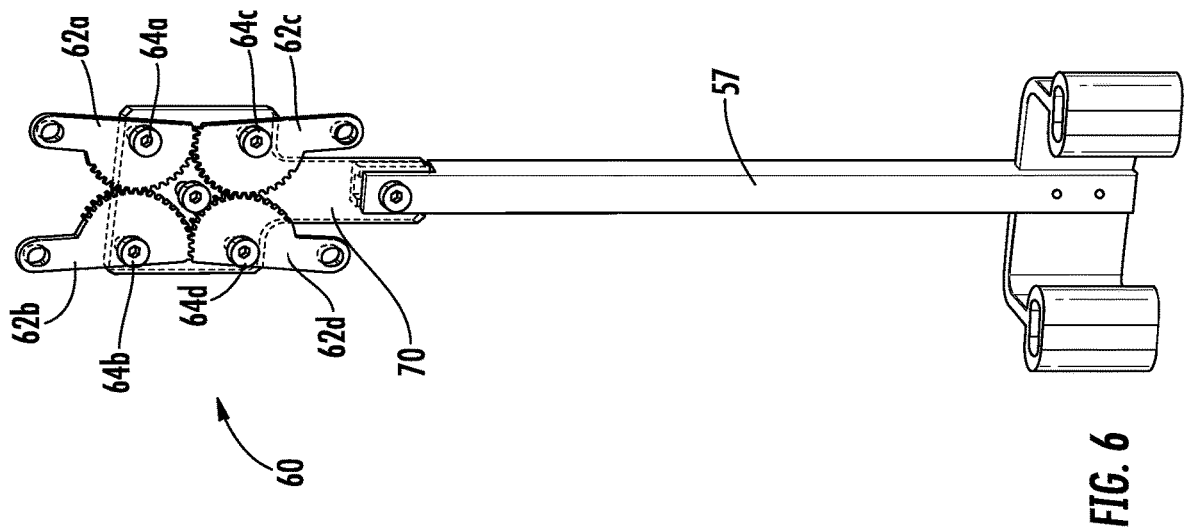
FIG. 6 is a perspective view of an engagement mechanism of the safety actuation device.

FIGS. 6 and 7 illustrate the engagement mechanism 60 of the safety actuation device 40 in greater detail. In an embodiment, the engagement mechanism 60 is comprised of four bar pinions 62a-62d, each bar pinion pivotable about a respective pivot 64a-64d that pivotably couples the bar pinions to a connector plate 70 at a first location of each bar pinion. The bar pinions 62a-62d are each pivotably coupled via pivots 72a-72d at a second location of each bar pinion to a respective brake pad 44a-44d, as shown in FIGS. 5, 8 and 9. Pivots 72a-72d ride in a slot 52 defined by the housing 50, or are otherwise constrained in the housing 50, so that any horizontal motion is constrained (but vertical motion is not) (FIG. 4). The bar pinions 62a-62d each have a respective plurality of teeth 74a-74d that are in meshed engagement with the teeth of two other bar pinions to maintain synchronized movement of the bar pinions, as described herein.

FIG. 8 depicts the electromagnetic actuators 42a-42d and magnetic brake pads 44a-44d in a default or non-engaged position (i.e., brake pads spaced from guide rail at a distance d), while FIG. 9 depicts the electromagnetic actuators 42a-42d and magnetic brake pads 44a-44d in an engaged position in contact with the guide rail 20. In operation, when the electromagnetic actuators 42a-42d are commanded to actuate the safety brake 24, the magnetic brake pads 44a-44d move horizontally toward the guide rail 20 in the direction A (FIG. 9), and in turn magnetically attach to the guide rail 20. Movement of the brake pads 44a-44d causes bar pinions 62a-62d to rotate about pivots 64a-64d in a synchronized manner due to the meshed engagement of the plurality of teeth 74a-74d. The attachment of the magnetic brake pads 44a-44d to the guide rail 20 results in the slowing of the magnetic brake pads 44a-44d on the guide rail 20 and pulls the linkage 57 and rod 59 relative to motion of the elevator car 16 via the operative connection provided by the connector 70 and bar pinions 62a-62d, thereby engaging the safety brake 24.

As noted above, FIG. 9 illustrates the safety actuation device 40 and safety in the engaged position with the magnetic brake pads 44a-44d magnetically attached to the guide rail 20. In this view it will be appreciated that the magnetic brake pads 44a-44d are magnetically attached to the guide rail 20, with the safety brake 24 also engaged to the guide rail 20 and the elevator car 16 being stopped.

To reset the safety brake 24 and safety actuation device 40 after the safety brake 24 has been engaged, the elevator car 16 is moved upward to align the electromagnetic actuators 42a-42d with the magnetic brake pads 44a-44d. Once aligned, electrical current is applied to each electromagnetic actuator 42a-42d in the opposite direction (opposite to that used to engage) to create an attractive force between the magnetic brake pads 44a-44d and the respective electromagnetic actuator 42a-42d overcoming the magnetic attraction of the magnetic brake pads 44a-44d to the guide rail 20. Advantageously, it will be appreciated that if one electromagnetic actuator is inoperable, the engagement mechanism 60 facilitates magnetic brake pads 44a-44d being lifted off the guide rail 20. The detachment of the magnetic brake pads 44a-44d from the guide rail 20 and reattachment to the respective electromagnetic actuator 42a-42d results in the magnetic brake pads 44a-44d being returned to the default position and once again ready for reengagement.

Advantageously with the embodiments disclosed herein, the engagement mechanism 60 permits both the synchronization of engagement of the magnetic brakes 44a-44d and the reset or disengagement with either electromagnetic actuator 42a-42d. That is, an input from either electromagnetic actuator will set in motion both magnetic brake pads 44a-44d. In addition, any differences, commonly referred to as synchronization errors, between the commands to the electromagnetic actuator or the response of the electromagnetic actuator will be minimized because of the overall coupling between the brake pads 44a-44d, the bar pinions 62a-62d, the connector 70 and the linkage 57. For example, synchronization errors might include any difference between the electromagnetic actuators 42a-42d electrical characteristics or response times, differences in the current commands, delay, and magnetic differences between the magnetic brake pads 44a-44d due to friction, fabrication tolerances, and the like. In addition, advantageously, this configuration also ensures that all magnetic brake pads 44a-44d are forced to attach to the guide rail 20 on engagement and detach from the guide rail 20 on disengagement, even if one electromagnetic actuator 42a-42d becomes inoperative.

Figure 10:
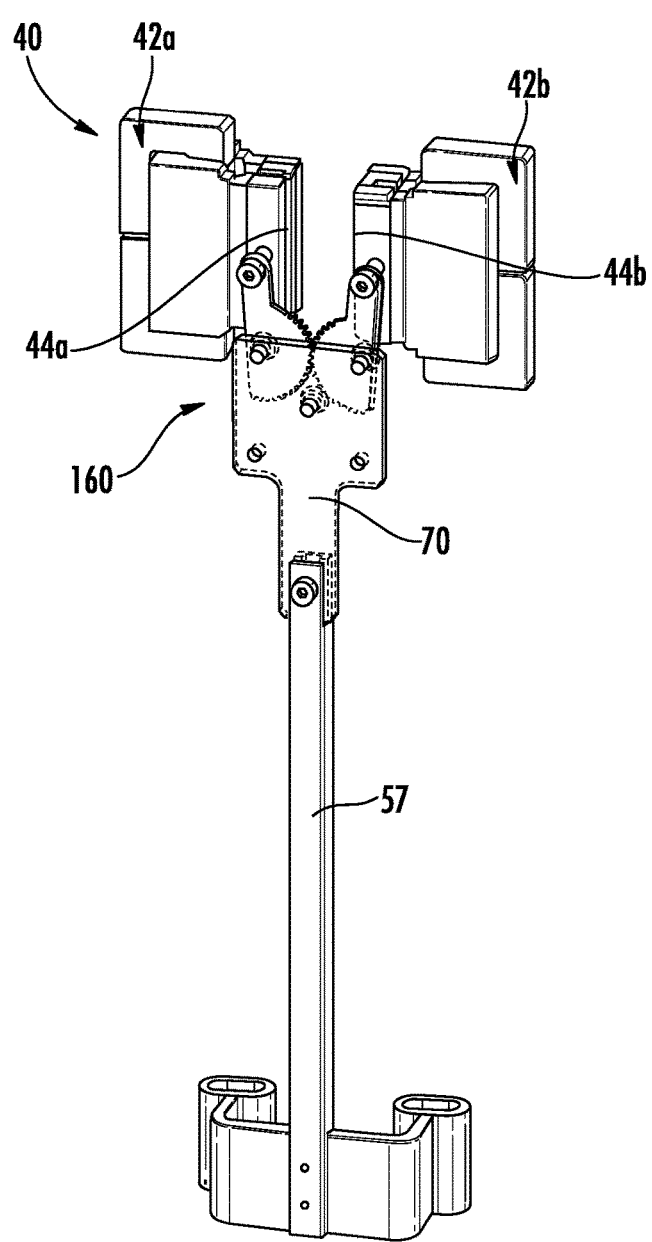
FIG. 10 is a perspective view of the safety actuation device according to another aspect of the disclosure.
Figure 11:
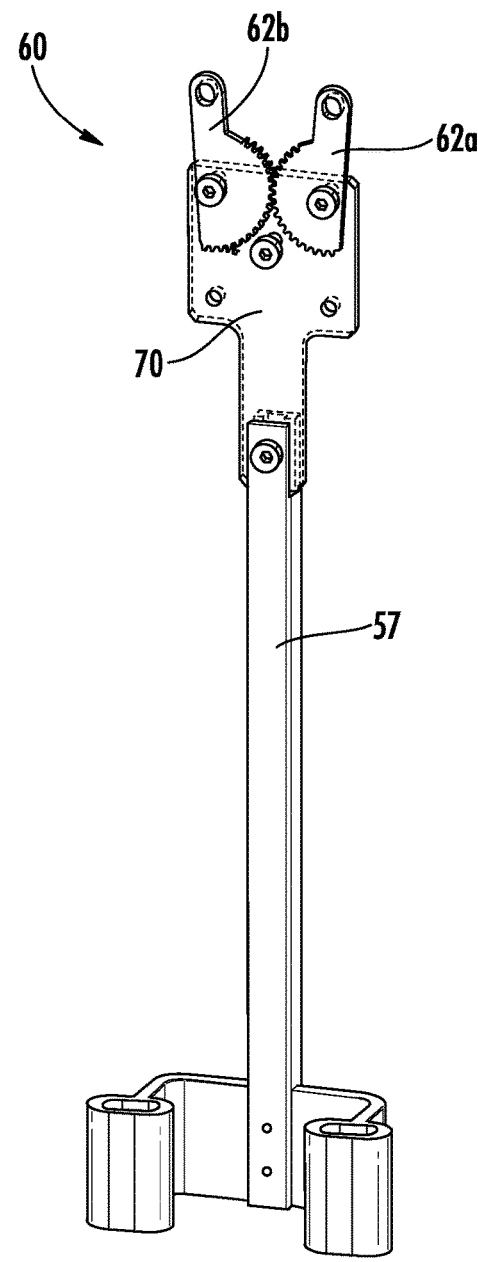
FIG. 11 is a perspective view of the engagement mechanism of the safety actuation device of FIG. 10.

Referring now to FIGS. 10 and 11, another embodiment of the safety actuation device 40 with an alternative engagement mechanism 160 is depicted. In this embodiment, the overall assembly and mechanisms are similar to embodiments associated with FIGS. 1-9, such that duplicative description of each component is omitted for clarity. Furthermore, where the reference numerals are unchanged, the function and description is the same as identified above with reference to those particular figures.

In the illustrated embodiment, only two electromagnetic actuators 42a and 42b are provided. Correspondingly, only two magnetic brake pads 44a and 44b are provided. Similarly, only two bar pinions 62a and 62b are provided. As shown, the actuators 42a, 42b, the brake pads 44a, 44b, and the bar pinions 62a, 62b are disposed on opposite sides of the guide rail 20.

Referring now to FIGS. 12 and 13, another embodiment of the safety actuation device 40 with an alternative engagement mechanism 260 is depicted. In this embodiment, the overall assembly and mechanisms are similar to embodiments associated with FIGS. 1-11, such that duplicative description of each component is omitted for clarity. Furthermore, where the reference numerals are unchanged, the function and description is the same as identified above with reference to those particular figures.

In the illustrated embodiment, only two electromagnetic actuators 42a and 42c are provided. Correspondingly, only two magnetic brake pads 44a and 44c are provided. Similarly, only two bar pinions 62a and 62c are provided. As shown, the actuators 42a, 42c, the brake pads 44a, 44c, and the bar pinions 62a, 62c are disposed on the same side of the guide rail 20. In this embodiment, the bar pinions 62a, 62c vertically connect the two brake pads 44a, 44c with the two actuators 42a, 42c on the same rail surface of the guide rail 20. This provides more room to accommodate electrical components in some embodiments.

Figure 14:
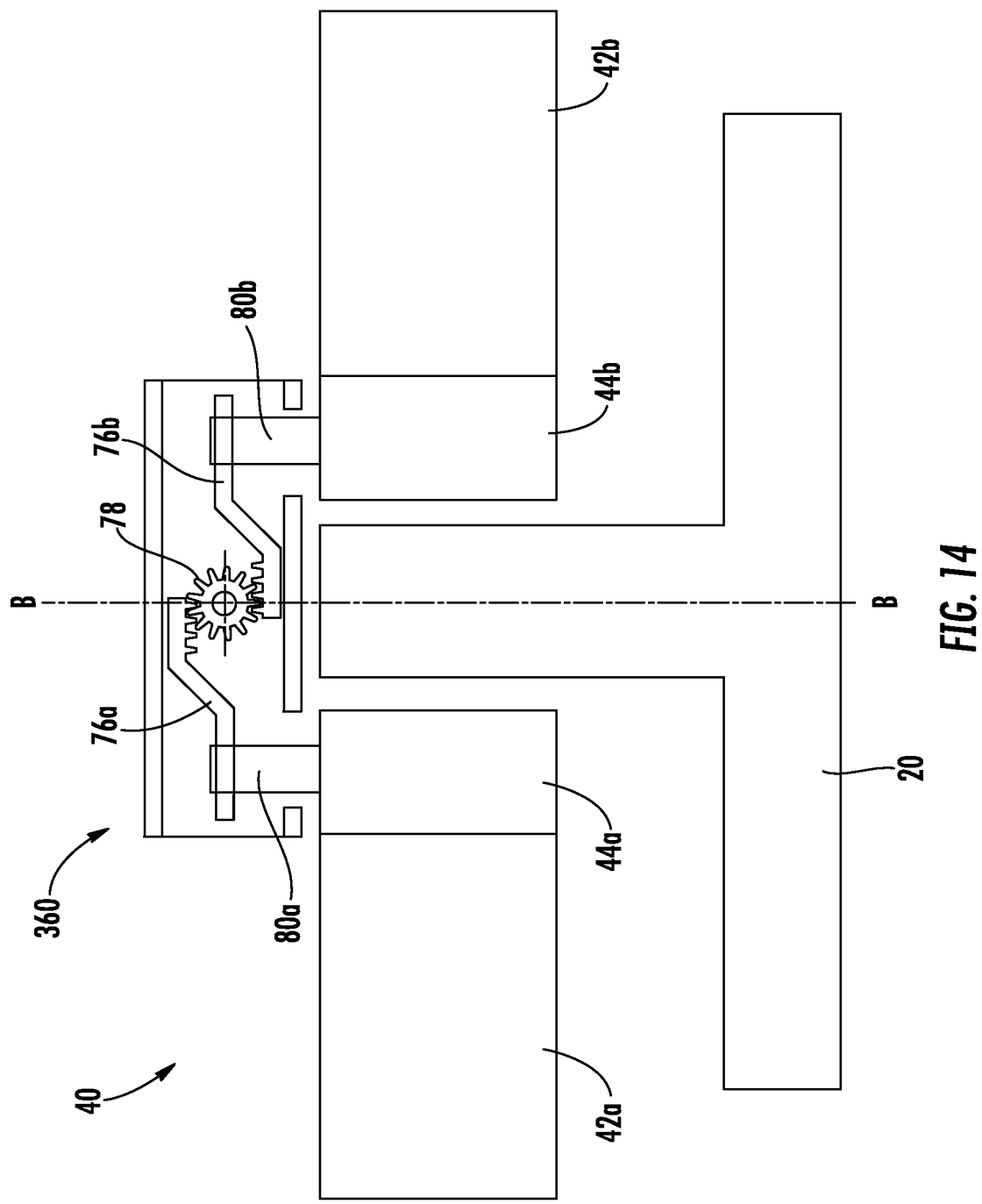
FIG. 14 is a top plan view of the safety actuation device according to another aspect of the disclosure.

Referring now to FIG. 14, another embodiment of the safety actuation device 40 with an alternative engagement mechanism 360 is depicted. In this embodiment, the overall assembly and mechanisms are similar to embodiments associated with FIGS. 1-13, such that duplicative description of each component is omitted for clarity. Furthermore, where the reference numerals are unchanged, the function and description is the same as identified above with reference to those particular figures.

The safety actuation device 40 is shown from a top plan perspective. As shown, the engagement mechanism 360 is a rack and pinion arrangement. In particular, actuators 42a, 42b are disposed on opposing sides of the guide rail 20, with corresponding brake pads 44a, 44b. The brake pads 44a, 44b are operatively coupled to a respective rack 76a, 76b via mechanical fasteners such as bolts 80a, 80b. Each rack 76a, 76b is in toothed engagement with a pinion 78 (which may also be referred to herein as a bar pinion) that is oriented along a central axis B-B of the guide rail 20. Movement of the brake pads 44a, 44b toward the guide rail 20 imparts rotation of the pinion 78 via the racks 76a, 76b. The common engagement of the racks 76a, 76b with the pinion 78 ensures synchronization of the overall assembly movement.

Embodiments may be implemented using one or more technologies. Various mechanical components known to those of skill in the art may be used in some embodiments.

Embodiments may be implemented as one or more apparatuses, systems, and/or methods. While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A selectively operable braking device for an elevator system including a car and a guide rail, comprising:
    a safety brake disposed on the car and adapted to be wedged against the guide rail when moved from a non-braking state into a braking state;
    an engagement mechanism moveable between an engaged position and a non-engaged position, the engagement mechanism comprising a plurality of bar pinions each having a plurality of teeth and operatively connected to at least one of the other plurality of bar pinions with a meshed engagement of the plurality of teeth, the engagement mechanism operatively coupled to the safety brake and configured to move the safety brake between the non-braking state and braking state when the engagement mechanism moves between the non-engaged position and the engaged position; and
    a plurality of magnetic brake pads, each of the brake pads operatively coupled to one of the plurality of bar pinions, wherein movement of one of the magnetic brake pads into the engaged position causes movement of the other magnetic brake pads into the engaged position.

2. The braking device of claim 1, wherein each of the bar pinions are operatively coupled to one of the magnetic brake pads at a first location of each bar pinion and operatively coupled to a connector plate at a second location of each bar pinion, the connector plate coupled to a linkage operatively coupled to the safety brake.

3. The braking device of claim 2, wherein the engagement mechanism includes four bar pinions, two of the bar pinions disposed on a first side of the guide rail and two of the bar pinions disposed on a second side of the guide rail.

4. The braking device of claim 3, wherein each of the bar pinions is in toothed engagement with two other bar pinions.

5. The braking device of claim 2, wherein the engagement mechanism includes two bar pinions, one of the bar pinions disposed on a first side of the guide rail and the other bar pinion disposed on a second side of the guide rail.

6. The braking device of claim 2, wherein the engagement mechanism includes two bar pinions, both of the bar pinions disposed on the same side of the guide rail.

7. The braking device of claim 1, further comprising a plurality of electromagnetic actuators, each of the electromagnetic actuators positioned to electromagnetically drive one of the plurality of magnetic brake pads between the non-engaged position and engaged position.

8. The braking device of claim 7, wherein at least one of the electromagnetic actuators is in operable communication with a controller, the controller configured to control the electricity supplied to the at least one of the electromagnetic actuators.

9. The braking device of claim 8, wherein the at least one of the electromagnetic actuators is configured to move the respective magnetic brake pad into the engaged position upon at least one of a reduction, an elimination, and an application of the electricity supplied by the controller.

10. The braking device of claim 8, wherein the at least one of the electromagnetic actuators is configured to return each of the plurality of magnetic brake pads into the non-engaged position upon reversal of the electricity supplied by the controller.

11. The braking device of claim 1, wherein the engagement mechanism is configured to synchronize the movement of the plurality of magnetic brake pads between the non-engaged position and the engaged position.

12. An elevator system comprising:
    a hoistway;
    a guide rail disposed in the hoistway;
    a car operably coupled to the guide rail by a car frame for upward and downward travel in the hoistway;
    a safety brake disposed on the car and adapted to be wedged against the guide rail when moved from a non-braking state into a braking state;
    an engagement mechanism moveable between an engaged position and a non-engaged position, the engagement mechanism comprising a plurality of bar pinions each having a plurality of teeth and operatively connected to at least one of the other plurality of bar pinions with a meshed engagement of the plurality of teeth, the engagement mechanism operatively coupled to the safety brake and configured to move the safety brake between the non-braking state and braking state when the engagement mechanism moves between the non-engaged position and the engaged position; and
    a plurality of magnetic brake pads, each of the brake pads operatively coupled to one of the plurality of bar pinions, wherein movement of one of the magnetic brake pads into the engaged position causes movement of the other magnetic brake pads into the engaged position.

13. The elevator system of claim 12, wherein each of the bar pinions are operatively coupled to one of the magnetic brake pads at a first location of each bar pinion and operatively coupled to a connector plate at a second location of each bar pinion, the connector plate coupled to a linkage operatively coupled to the safety brake.

14. The elevator system of claim 13, wherein the engagement mechanism includes four bar pinions, two of the bar pinions disposed on a first side of the guide rail and two of the bar pinions disposed on a second side of the guide rail.

15. The elevator system of claim 14, wherein each of the bar pinions is in toothed engagement with two other bar pinions.

16. The elevator system of claim 13, wherein the engagement mechanism includes two bar pinions, one of the bar pinions disposed on a first side of the guide rail and the other bar pinion disposed on a second side of the guide rail.

17. The elevator system of claim 13, wherein the engagement mechanism includes two bar pinions, both of the bar pinions disposed on the same side of the guide rail.

18. A selectively operable braking device for an elevator system including a car and a guide rail, comprising:
- a safety brake disposed on the car and adapted to be wedged against the guide rail when moved from a non-braking state into a braking state;
- a first magnetic brake pad moveable between an engaged condition and a non-engaged condition with the guide rail;
- a second magnetic brake pad moveable between the engaged condition and the non-engaged condition with the guide rail;
- a first toothed rack operatively coupled to the first magnetic brake pad and moveable therewith;
- a second toothed rack operatively coupled to the second magnetic brake pad and moveable therewith; and
- a pinion in toothed engagement with the first toothed rack and the second toothed rack, wherein the operative connection between the toothed racks with the pinion imparts movement of one of the magnetic brake pads upon movement of the other magnetic brake pad.

* * * * *